(12) United States Patent
Koizumi et al.

(10) Patent No.: US 9,783,104 B2
(45) Date of Patent: Oct. 10, 2017

(54) CUP HOLDER FOR VEHICLE

(71) Applicants: KABUSHIKI KAISHA TOYOTA JIDOSHOKKI, Kariya-shi, Aichi (JP); TOYOTA JIDOSHA KABUSHIKI KAISHA, Toyota-shi, Aichi (JP)

(72) Inventors: Atsushi Koizumi, Kariya (JP); Katsutoshi Sakanashi, Toyota (JP); Tomoya Une, Toyota (JP)

(73) Assignees: KABUSHIKI KAISHA TOYOTA JIDOSHOKKI, Kariya-shi, Aichi (JP); TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 210 days.

(21) Appl. No.: 14/443,531

(22) PCT Filed: Nov. 18, 2013

(86) PCT No.: PCT/JP2013/081041
§ 371 (c)(1),
(2) Date: May 18, 2015

(87) PCT Pub. No.: WO2014/077388
PCT Pub. Date: May 22, 2014

(65) Prior Publication Data
US 2015/0291090 A1 Oct. 15, 2015

(30) Foreign Application Priority Data
Nov. 19, 2012 (JP) ................ 2012-253397

(51) Int. Cl.
*F21V 9/00* (2015.01)
*B60Q 3/64* (2017.01)
(Continued)

(52) U.S. Cl.
CPC ............... *B60Q 3/64* (2017.02); *B60N 3/10* (2013.01); *B60N 3/101* (2013.01); *B60Q 3/20* (2017.02)

(58) Field of Classification Search
CPC .................................. B60N 3/10; B60N 3/101
See application file for complete search history.

(56) References Cited

U.S. PATENT DOCUMENTS

| 6,193,399 B1 * | 2/2001 | Hulse ................. B60N 3/10 362/101 |
| 2008/0266853 A1 * | 10/2008 | Goto ................... B60Q 3/004 362/240 |

(Continued)

FOREIGN PATENT DOCUMENTS

| JP | 2003191782 A | 7/2003 |
| JP | 200514655 A | 1/2005 |

(Continued)

OTHER PUBLICATIONS

Communication dated Nov. 21, 2016, from the European Patent Office in counterpart European application No. 13855136.1.

(Continued)

*Primary Examiner* — Alexander Garlen
(74) *Attorney, Agent, or Firm* — Sughrue Mion, PLLC

(57) ABSTRACT

A holder 20 has a holder side wall 22 provided with a through hole 26, while an outer peripheral extension 43 of a lightguide 40 is inserted through the through hole 26. Therefore, even when the holder 20 is a "hollowed integral holder" formed integrally with a design panel 60, the lightguide 40 comprising a ring part 41 and the outer peripheral extension 43 can be assembled to the holder 20.

2 Claims, 6 Drawing Sheets

(51) Int. Cl.
*B60N 3/10* (2006.01)
*B60Q 3/20* (2017.01)

(56) References Cited

U.S. PATENT DOCUMENTS

2011/0261579 A1* 10/2011 Anderson .............. B60N 3/108
362/551
2013/0258670 A1* 10/2013 Abro ...................... B60N 3/101
362/253

FOREIGN PATENT DOCUMENTS

| JP | 2005-329753 A | 12/2005 |
| JP | 2007203800 A | 8/2007 |
| WO | 2011/094728 A1 | 8/2011 |

OTHER PUBLICATIONS

International Preliminary Report on Patentability dated May 28, 2015, issued by the International Bureau of WIPO in counterpart International Application No. PCT/JP2013/081041.
An International Search Report mailed Jan. 28, 2014, which issued during the prosecution of Applicant's PCT/JP2013/081041.

* cited by examiner

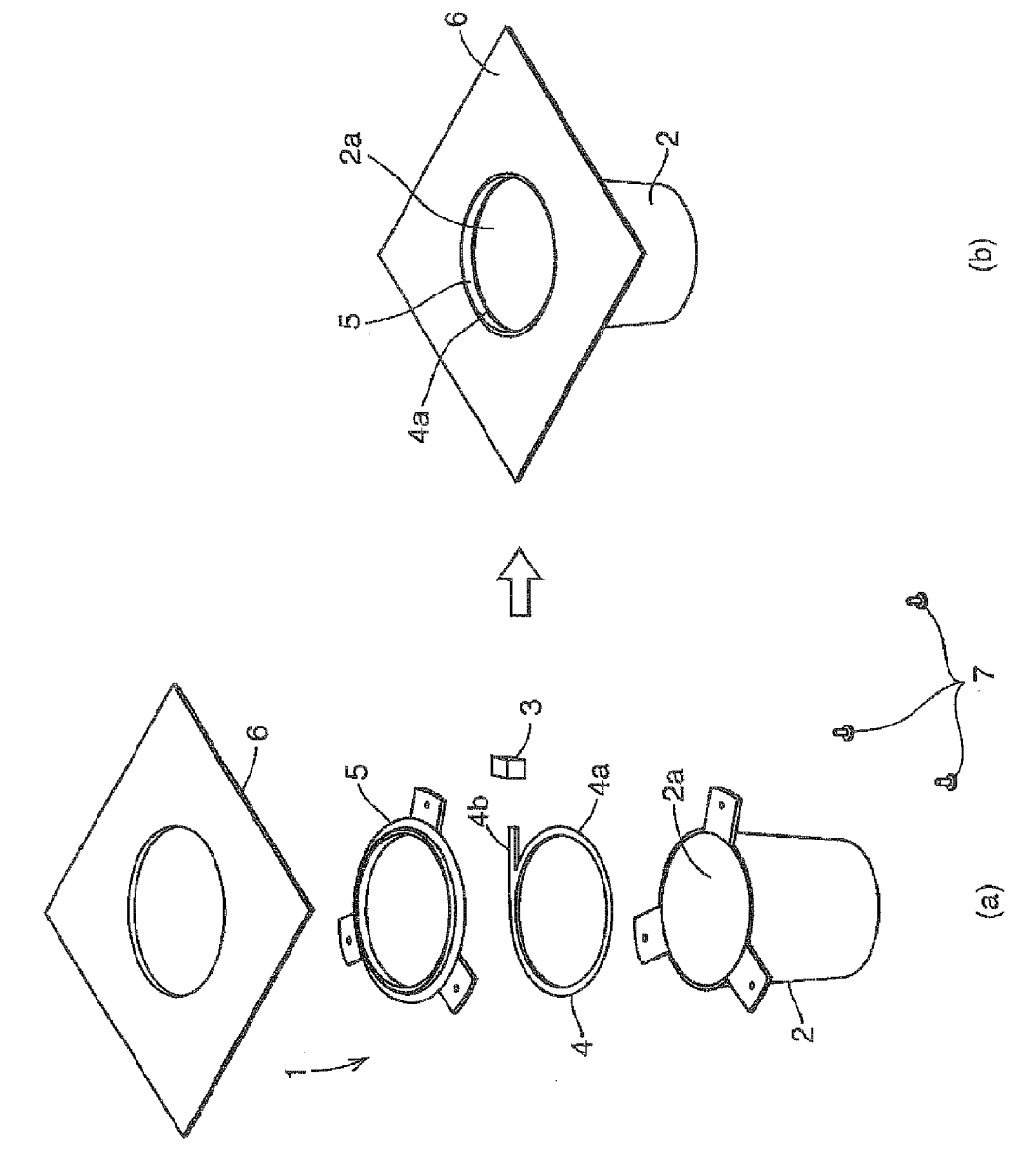

CUP HOLDER FOR VEHICLE

TECHNICAL FIELD

The present invention relates to a cup holder having ring illumination for a vehicle.

BACKGROUND ART

As illustrated in FIG. 6, a conventional vehicle cup holder 1 having ring illumination has a holder 2 provided with a beverage container receiver 2a, a light source unit 3, a lightguide (light emitter) 4 comprising a ring part 4a and an outer peripheral extension 4b extending from the ring part 4a to the outer periphery side, and a decorating bezel 5. The holder 2 is formed separately from a design panel (interior panel) 6 of an automobile and fastened to the design panel 6 with screws 7.

For satisfying performances required for the cup holder, it is necessary for the holder 2 separated from the design panel 6 to be fastened to the design panel 6 with the screws 7 as a measure for preventing it from dropping out. Changing the holder 2 to a "hollowed integral holder" integrally formed with the design panel 6 can reduce expenses for parts of the separate holder 2 and screws 7 and their assembly, thereby cutting cost down. However, the following problem will occur if the "hollowed integral holder" achieve ring illumination.

While the holder 2 and design panel 6 may hold the lightguide 4 therebetween when assembling the holder 2 to the design panel 6, the outer peripheral extension 4b hinders the lightguide 4 from being assembled to the "hollowed integral holder," whereby the lightguide 4 cannot be assembled.

CITATION LIST

Patent Literature

Patent Literature 1: Japanese Patent Application Laid-Open No. 2007-203800

SUMMARY OF INVENTION

Technical Problem

It is an object of the present invention to provide a vehicle cup holder which enables a lightguide having a ring part and an outer peripheral part to be assembled to a holder even when the holder is formed integrally with a design panel.

Solution to Problem

The present invention achieving the above-mentioned object is as follows:
(1) A vehicle cup holder having a holder, a light source unit, and a lightguide;
wherein the holder is formed integrally with a design panel of an automobile, the holder comprising a holder bottom wall and a holder side wall extending from the holder bottom wall, and the holder having a beverage container receiver adapted to receive a beverage container therein;
wherein the light source unit comprises a light source;
wherein the lightguide comprises a ring part disposed so as to surround an opening part of the beverage container receiver; a light-receiving surface for introducing light from the light source into the lightguide; and an outer peripheral extension disposed so as to extend from the ring part to the outer periphery side of the ring part and guiding the light introduced from the light-receiving surface into the lightguide to the ring part;
wherein the holder side wall is provided with a through hole; and
wherein the outer peripheral extension is inserted through the through hole.
(2) A vehicle cup holder according to (1), wherein the light source unit comprises a support secured to the holder and supporting the light source; and
wherein the support comprises a shield wall located between the light source and through hole, the shield wall preventing the light from the light source from directly passing through the through hole toward the ring part.

Advantageous Effects of Invention

In the vehicle cup holder of the above (1), the holder side wall of the holder is provided with a through hole, while the outer peripheral extension of the lightguide is inserted through the through hole, whereby the lightguide comprising the ring part and outer peripheral extension can be assembled to the holder even when the holder is formed integrally with a design panel.

In the vehicle cup holder of the above (2), the light source unit comprises a support, while the support has a shield wall, whereby the light from the light source can be prevented from directly passing through the through hole toward the ring part even when the holder side wall is provided with the through hole.

BRIEF DESCRIPTION OF DRAWINGS

FIGS. 6(a) and 6(b) are an exploded perspective view and a perspective view of a conventional vehicle cup holder, respectively.

DESCRIPTION OF EMBODIMENTS

Figure 1:
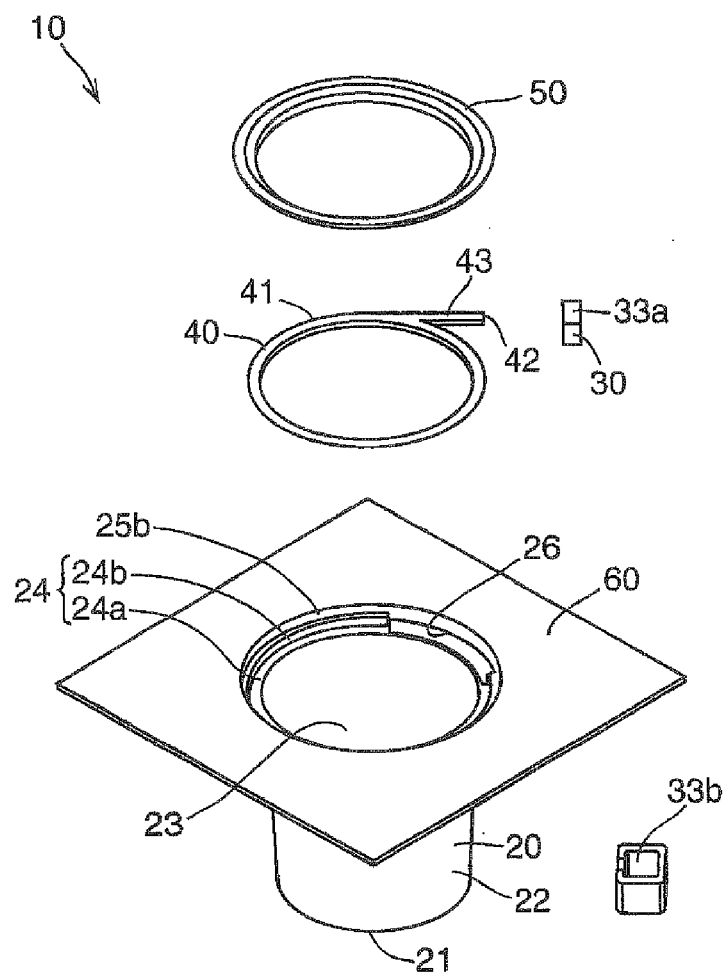
FIG. 1 is an exploded perspective view of the vehicle cup holder in accordance with an embodiment of the present invention.
Figure 2:
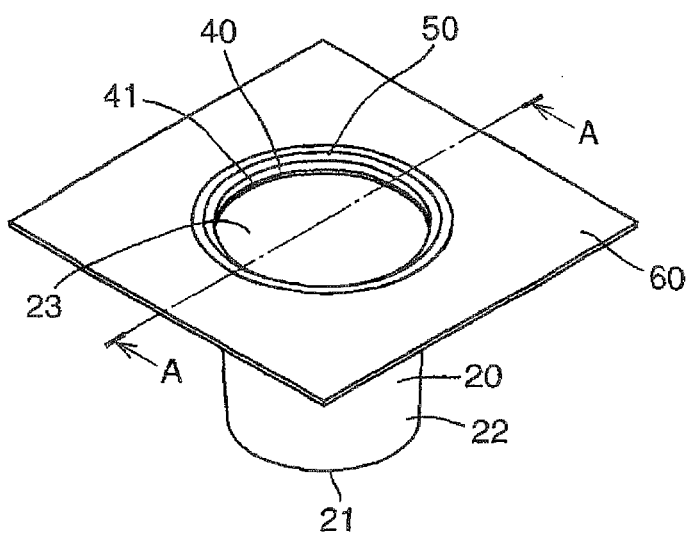
FIG. 2 is a perspective view of the vehicle cup holder in accordance with the embodiment of the present invention.

The vehicle cup holder in accordance with an embodiment of the present invention will be explained with reference to the drawings. As illustrated in FIG. 1, the vehicle cup holder 10 in accordance with the embodiment of the present invention has a holder 20, a light source unit 30, a lightguide 40, and a decorating bezel 50.

The holder 20 is formed integrally with a design panel (interior panel) 60 of an automobile. The holder 20, which is a die-molded product made of a resin, is molded integrally with the design panel 60. The design panel 60 may be a console upper panel, an instrument panel, or any of others, for example.

Figure 3:
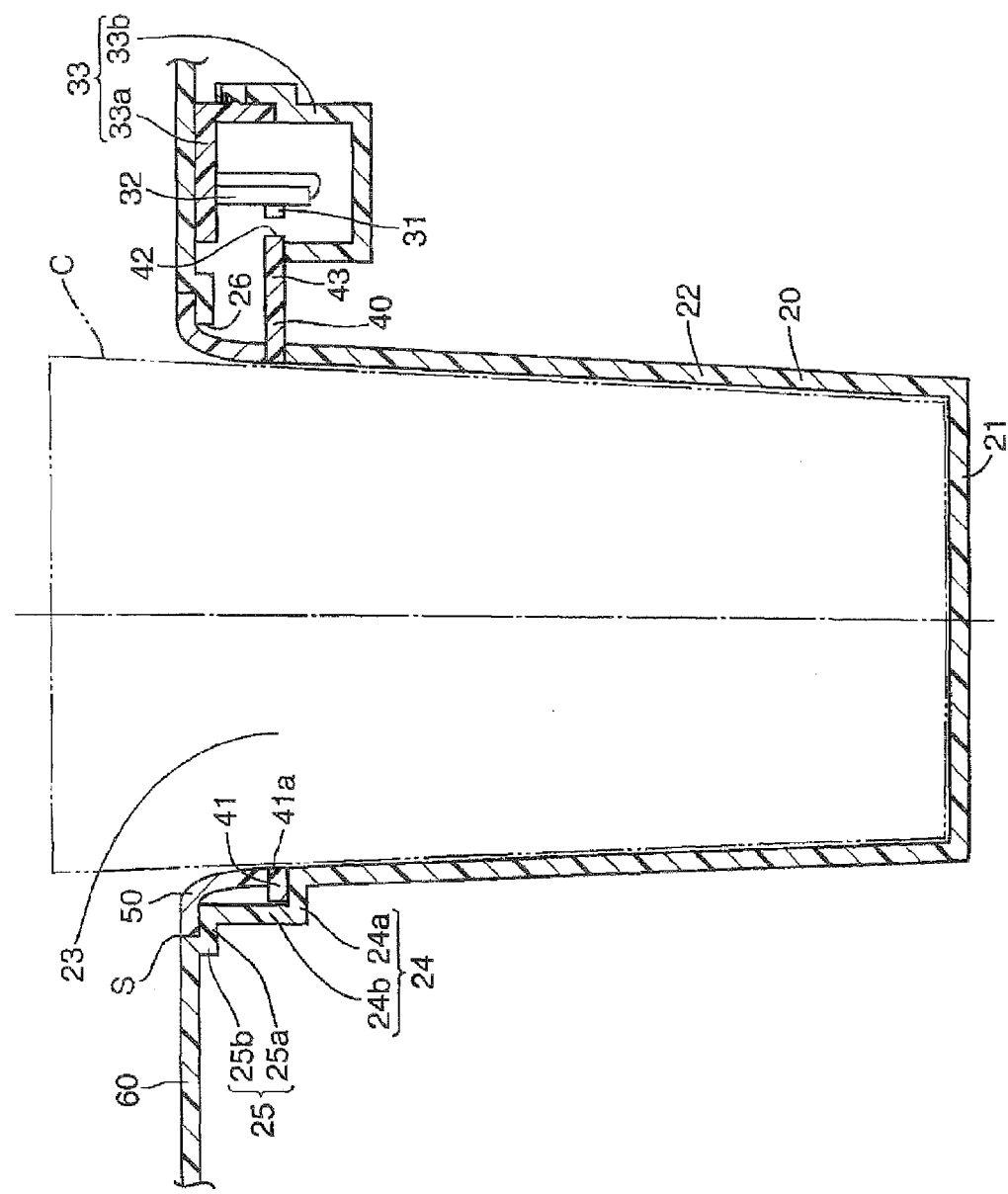
FIG. 3 is an enlarged perspective view taken along the line A-A of FIG. 2.

As illustrated in FIG. 3, the holder 20 is a bottomed tubular body comprising a holder bottom wall 21 and a holder side wall 22 extending up from an outer peripheral edge of the holder bottom wall 21. The holder 20 may be a bottomed cylindrical body or a bottomed non-cylindrical body which is not depicted. The holder 20 has a beverage container receiver 23 adapted to receive a beverage container C therein (in an inner space surrounded by the holder bottom wall 21 and holder side wall 22). The upper face side of the beverage container receiver 23 is open to thereabove.

At an upper end part, the holder side wall 22 has first and second steps 24, 25 which increase the capacity of the beverage container receiver 23.

The first step 24 consists of a first horizontal extension 24a and a first upward extension 24b extending upward from an outer peripheral edge of the first horizontal extension 24a. The ring part 41 of the lightguide 40 is mounted on the first horizontal extension 24a. The first step 24 supports the ring part 41 of the lightguide 40 from thereunder.

The second step 25 is located higher than the first step 24. The second step 25 consists of by a second horizontal extension 25a extending horizontally from an upper end part of the first upward extension 24b of the first step 24 to the outer periphery side and a second upward extension 25b extending upward from an outer peripheral edge of the second horizontal extension 25a so as to reach the design panel 60. An outer peripheral end part of the decorating bezel 50 is located at a part where the capacity of the beverage container receiver 23 is enhanced by the second step 25. The outer peripheral end of the decorating bezel 50 is on the outer periphery side of the inner peripheral end of the second horizontal extension 25a, so as to prevent light from leaking from a gap S between the outer peripheral end of the decorating bezel 50 and the design panel 60 to the outside of the cup holder 10.

Figure 4:
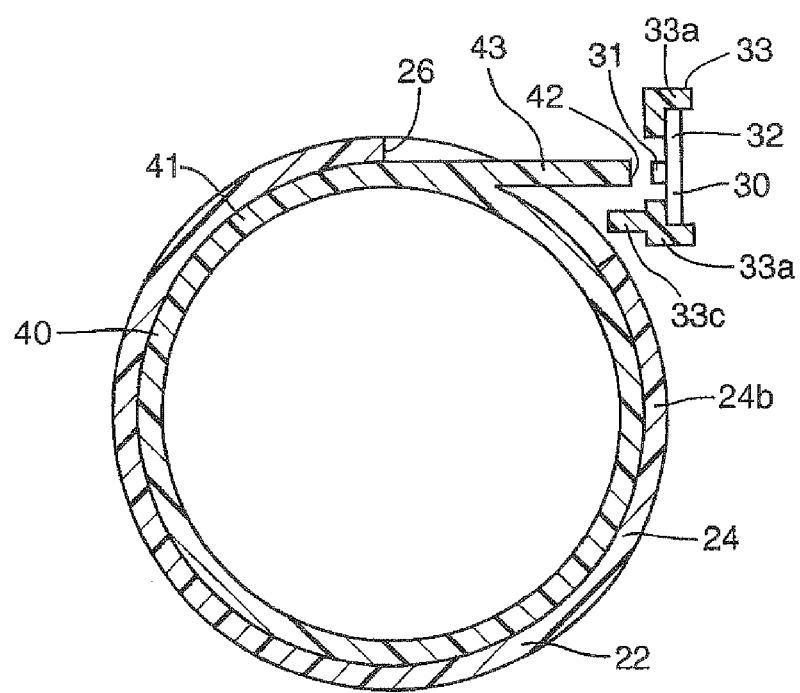
FIG. 4 is an enlarged cross-sectional view of the vehicle cup holder in accordance with the embodiment of the present invention taken at a position of a lightguide.
Figure 5:
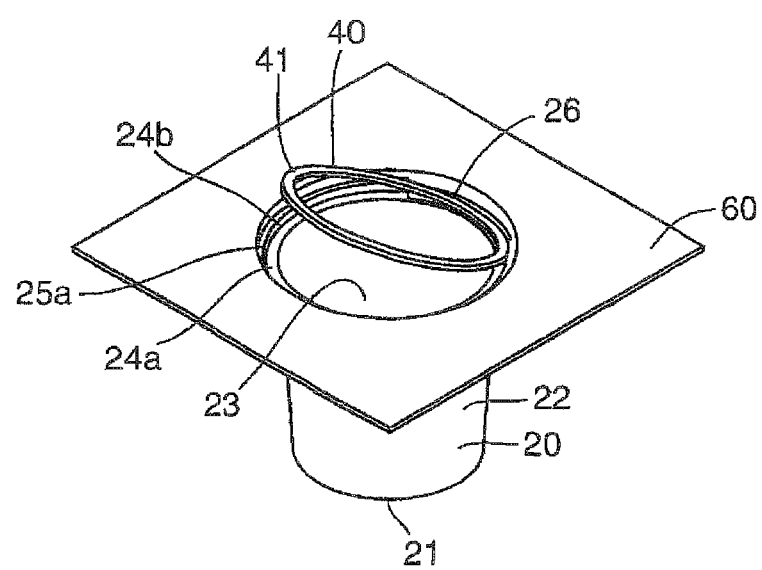
FIG. 5 is a perspective view of the vehicle cup holder in accordance with the embodiment of the present invention illustrating a state in the process of assembling the lightguide to the holder.

The holder side wall 22 is provided with a through hole 26. The through hole 26 is formed only partly in the vertical direction of the holder side wall 22. As illustrated in FIG. 4, the through hole 26 is formed only partly (e.g., less than 180°, preferably less than 90°) in the circumferential direction of the holder side wall 22. An outer peripheral extension 43 of the lightguide 40 is inserted through the through hole 26. The through hole 26 is provided in the first step 24. As illustrated in FIG. 3, the through hole 26 is provided not only in the first upward extension 24b but also in the first horizontal extension 24a in the first step 24. This aims to prevent the outer peripheral extension 43 of the lightguide 40 from contacting the first horizontal extension 24a and failing to assemble the lightguide 40 to the holder 20 when tilting the lightguide 40 so as to assemble it to the holder 20 from obliquely thereabove as illustrated in FIG. 5.

As illustrated in FIG. 3, the light source unit 20 comprises a light source 31, a substrate 32, and a support 33.

Only one light source 31 is provided. However, two or more light sources 31 may be provided. The light source 31 consists of an LED (light-emitting diode) or a bulb, for example. The LED is preferably used in particular. This is because the LED has a small size and thus is advantageous in terms of making the light source unit 30 smaller. Another reason is that it has a small amount of heat generation and thus can reduce the influence of heat on its surrounding members (such as the substrate 32, support 33, and lightguide 40). The light source 31 is securely attached to the substrate 32.

The support 33 is a die-molded product made of a resin. The support 33 is secured to the holder 20 or design panel 60. The support 33 is provided in order to support the light source 31 through the substrate 32 and prevent the light from the light source 31 from leaking to the surroundings of the cup holder 10. The support 33 may consist of one or a plurality of components. The illustrated example of the present invention indicates a case in which the support 33 consists of two components, i.e., first and second support elements 33a, 33b, secured to each other through engagement with claws and the like.

As illustrated in FIG. 4, the support 33 comprises a shield wall 33c located (extending toward or entering) between the light source 31 and through hole 26. The shield wall 33c is provided in order to prevent the light from the light source 31 from directly passing through the through hole 26 toward the ring part 41 of the lightguide 40 (toward the beverage container receiver 23) without being introduced into the lightguide 40 from the light-receiving surface 42 of the lightguide 40. The shield wall 33c may be formed on the first support element 33a integrally, or on the second support element integrally.

The lightguide 40 consists of a light-transmitting material, for example. The light-transmitting material is polycarbonate, acrylic resins and the like, for example. The lightguide 40 is disposed within a single plane. The lightguide 40 preferably consists of a single component in order to reduce the number of components. The lightguide 40 is a die-molded product. The lightguide 40 comprises the ring part 41, light-receiving surface 42, and outer peripheral extension 43.

Only one ring part 41 is provided. The ring part 41 continuously extends all around in the circumferential direction. The ring part 41 is arranged at the first step 24 of the holder side wall 22 so as to surround the opening part (and its vicinity) of the beverage container receiver 23. The cross-section shape of the ring part 41 is a rectangular, for example. The light coming to the ring part 41 through the outer peripheral extension 43 after being introduced into the lightguide 40 from the light-receiving surface 42 progresses circumferentially of the ring part 41 while being diffused within the ring part 41. This makes an inner peripheral surface 41a of the ring part 41 emit light all around in a ring pattern.

The light-receiving surface 42 is provided for introducing the light from the light source 31 into the lightguide 40. The light-receiving surface 42 is disposed at the outer peripheral extension 43 in order to prevent luminance from becoming uneven in the ring part 41 due to the light-receiving surface 42. The light-receiving surface 42 is preferably disposed at a part of the outer peripheral extension 43 which is the farthest from the ring part 41. Only one light-receiving surface 42 is provided. The light-receiving surface 42 is located at such a position as to oppose the light source 31. The light-receiving surface 42 is distanced from the light source 31 so as to be less susceptible to the heat of the light source 31. The light-receiving surface 42 may be any of flat, convex, and concave surfaces.

The outer peripheral extension 43 is disposed so as to extend (project) to the outer periphery side of the ring part 41 from a circumferential portion of the ring part 41. The outer peripheral extension 43 is disposed so as to extend tangentially of the ring part 41 therefrom. Only one outer peripheral extension 43 is provided. The outer peripheral extension 43 guides the light introduced from the light-receiving surface 42 into the lightguide 40 to the ring part 41. The outer peripheral extension 43 causes the light introduced from the light-receiving surface 42 into the lightguide 40 to enter the ring part 41 from one side in the circumferential direction of the ring part 41. The outer peripheral extension 43 passes through the through hole 26, so as to extend from the inside of the holder 20 to the outside thereof.

The decorating bezel 50 is made of a resin, for example. As illustrated in FIG. 1, the decorating bezel 50 has a ring shape which is continuous all around. The decorating bezel 50 is secured to the holder 20 or design panel 60 through engagement with claws, for example. As illustrated in FIG. 3, the decorating bezel 50 covers the first and second steps 24, 25 and the ring part 41 mounted thereon from above them such that only the inner peripheral surface 41*a* of the ring part 41 is exposed to the inside of the beverage container receiver 23. Since the decorating bezel 50 covers the first and second steps 24, 25 from thereabove, the first and second steps 24, 25 are less visible, which can improve the design of the cup holder 10. Since the decorating bezel 50 covers the ring part 41 from thereabove, the light leaking upward from the upper face of the ring part 41 can be prevented from advancing to the interior of the vehicle. The lower end part of the decorating bezel 50 is in contact with the upper face of the ring part 41 and cooperates with the first step 24 so as to hold the ring part 41 therebetween.

Herein below, operations of the embodiment of the present invention is explained. Since the through hole 26 is provided in the holder side wall 22 of the holder 20, while the outer peripheral extension 43 of the lightguide 40 is inserted through the through hole 26, the embodiment of the present invention can assemble the lightguide 40 comprising the ring part 41 and outer peripheral extension 43 to the holder 20 even when the holder 20 is a "hollowed integral holder" integrally formed with the design panel 60.

Since the holder 20 is formed integrally with the design panel 60, as compared with a (conventional) case where a holder is formed separately from a design panel and secured thereto by fastening with screws, expenses for parts of the separate holder and screws and their assembly can be cut down.

Since fastening with screws can be eliminated, the structure of the rear face of the design panel 60 can also be simplified. This can form a space on the backside of the design panel 60, in which structures other than the cup holder 10 can be arranged.

Since the light source unit 30 comprises the support 33, which is provided with the shield wall 33*c*, even when the through hole 26 is provided in the holder side wall 22, the light from the light source 31 can be prevented from directly passing through the through hole 26 toward the ring part 41.

REFERENCE SIGNS LIST

10 cup holder
20 holder
21 holder bottom wall
22 holder side wall
23 beverage container receiver
24 first step
24*a* first horizontal extension
24*b* first upward extension
25 second step
25*a* second horizontal extension
25*b* second upward extension
26 through hole
30 light source unit
31 light source
32 substrate
33 support
33*a* first support element
33*b* second support element
40 lightguide
41 ring part
42 light-receiving surface
43 outer peripheral extension
50 decorating bezel
60 design panel
S gap

The invention claimed is:

1. A vehicle cup holder having a holder, a light source unit, a lightguide, and a decorating bezel;
   wherein the holder is formed integrally with a design panel of an automobile, the holder comprising a holder bottom wall and a holder side wall extending from the holder bottom wall, and the holder having a beverage container receiver adapted to receive a beverage container therein;
   wherein the light source unit comprises a light source;
   wherein the lightguide comprises a ring part disposed so as to surround an opening part of the beverage container receiver; a light-receiving surface for introducing light from the light source into the lightguide; and an outer peripheral extension disposed so as to extend from the ring part to the outer periphery side of the ring part and
   guiding the light introduced from the light-receiving surface into the lightguide to the ring part;
   wherein the holder side wall is provided with a through hole;
   wherein the outer peripheral extension is inserted through the through hole;
   wherein the holder side wall has first and second steps;
   wherein the first step comprises a first horizontal extension mounted with the ring part of the lightguide and a first upward extension extending upward from an outer peripheral edge of the first horizontal extension;
   wherein the second step is located higher than the first step and comprises a second horizontal extension extending horizontally from an upper end part of the first upward extension of the first step to the outer periphery side and a second upward extension extending upward from an outer peripheral edge of the second horizontal extension so as to reach the design panel; and
   wherein the decorating bezel covers the first step, the second horizontal extension of the second step, and the ring part from above such that only the inner peripheral surface of the ring part is exposed to the inside of the beverage container receiver.

2. A vehicle cup holder according to claim 1, wherein the light source unit comprises a support secured to the holder and supporting the light source; and
   wherein the support comprises a shield wall located between the light source and through hole, the shield wall preventing the light from the light source from directly passing through the through hole toward the ring part.

* * * * *